United States Patent [19]

Funato et al.

[11] Patent Number: 4,971,414
[45] Date of Patent: Nov. 20, 1990

[54] OPTICAL INFORMATION RECORD/READ APPARATUS

[75] Inventors: Hiroyoshi Funato, Chigasaki; Shigeyoshi Misawa, Tokyo, both of Japan

[73] Assignee: Ricoh Company, Ltd., Tokyo, Japan

[21] Appl. No.: 367,265

[22] Filed: Jun. 16, 1989

[30] Foreign Application Priority Data

Jun. 24, 1988 [JP] Japan .................................. 63-156371

[51] Int. Cl.$^5$ ........................ G02B 6/34; G11B 7/00; G01J 1/20; G01D 15/10
[52] U.S. Cl. .............................. 350/96.19; 350/96.11; 350/96.12; 350/96.14; 350/96.18; 369/44.11; 369/44.12; 369/112; 250/201.5; 250/227.11; 250/570; 346/76 L; 346/33 A
[58] Field of Search ............... 350/96.11, 96.12, 96.13, 350/96.14, 96.15, 96.18, 96.19, 96.20; 369/44.11, 44.12, 112; 250/201.5, 227.11, 570; 346/76 L, 33 A

[56] References Cited

U.S. PATENT DOCUMENTS

| | | | |
|---|---|---|---|
| 4,672,187 | 6/1987 | Fujita et al. | 250/201.5 X |
| 4,699,453 | 10/1987 | Roberts | 350/96.20 |
| 4,716,559 | 12/1987 | Hine | 369/112 |
| 4,718,052 | 1/1988 | Kondo et al. | 350/96.19 X |
| 4,733,065 | 3/1988 | Hoshi et al. | 250/201.5 X |
| 4,779,259 | 10/1988 | Kono et al. | 369/44.12 |
| 4,801,184 | 1/1989 | Revelli | 350/96.14 |
| 4,823,331 | 4/1989 | Yoshitoshi et al. | 369/112 X |
| 4,858,215 | 8/1989 | Yano et al. | 250/201.5 X |
| 4,861,128 | 8/1989 | Ishikawa et al. | 350/96.12 X |
| 4,885,732 | 12/1989 | Sunagawa et al. | 350/96.14 |
| 4,887,255 | 12/1989 | Handa et al. | 369/112 |

Primary Examiner—Brian Healy
Attorney, Agent, or Firm—Oblon, Spivak, McClelland, Maier & Neustadt

[57] ABSTRACT

An optical information record/read apparatus comprises a light source for emitting light, a converging optical system for converging the emitted light from the light source on the optical record medium so that the converged light is reflected by the optical record medium, and an optical waveguide element having a waveguide layer. A light coupling system is provided for coupling the reflected light from the optical record medium with the waveguide layer so that the light coupled with the waveguide layer is then propagated, as a guided light, within the waveguide layer. At least a part of the light coupling system is integrally formed with the optical waveguide element. A light detecting system for detecting the guided light propagated within the waveguide layer is integrally formed with the optical waveguide element. A waveguide reflection optical system for reflecting the guided light within the waveguide layer toward the light detecting system while converging the same is formed as a part of an end face of the waveguide layer.

22 Claims, 5 Drawing Sheets

OPTICAL INFORMATION RECORD/READ APPARATUS

BACKGROUND OF THE INVENTION

The present invention relates generally to an optical information record/read apparatus with which an optical information can be recorded on and/or read out from an optical record medium and which is generally called an optical pickup. More particularly, the invention relates to an optical information record/read apparatus which employs an optical waveguide element.

An optical information record/read apparatus employing an optical waveguide element has been proposed. The use of such an optical waveguide element can make it possible to fabricate a small-sized and lightweight optical information record/read apparatus. Therefore, recently, it has been attempted to put into practice an optical information record/read apparatus employing an optical waveguide element.

Generally, an optical waveguide element for use in an optical information record/read apparatus comprises a waveguide layer formed on a transparent substrate. The waveguide layer is provided with a light coupling means for coupling the light beam reflected from the optical record medium with the waveguide layer so that the light beam coupled with the waveguide layer is then propagated through the waveguide layer as a guided light beam. The waveguide layer is further provided with a light detecting system for detecting the guided light beam, and a waveguide reflection optical system for leading the guided light beam, propagated through the waveguide layer, toward the light detecting system while converging the same.

The use of a waveguide lens as a waveguide optical system, such as mode index lens, Luneburg lens, geodesic lens or grating lens, which are described in OYOBUTURI, Japan Society of Applied Physics, Vol. 48, No. 3, p. 241 et seq., 1979, has been proposed. These waveguide lenses, however, make it difficult to put into practice the optical information record/read apparatus having the waveguide element, due to the following reason.

In the fabricating process of the mode index lens or the Luneburg lens, it is necessary to control the refractive index thereof with extremely high accuracy. However, with the present techniques, it is generally difficult to perform such control with extremely high accuracy. Accordingly, in the present stage, it is difficult, in view of mass production, to put into practice the optical waveguide element having the mode index lens or Luneburg lens.

The geodesic lens is made by forming a depression having a non-spherical inner surface on the surface of the waveguide layer. Machining of such a non-spherical depression is generally difficult and thus requires precise grinding and subsequent polishing processes. Accordingly, the use of the geodesic lens makes it difficult to mass-produce the waveguide optical system, resulting in an increase of manufacturing cost.

On the other hand, the grating lens can be relatively easily fabricated with low manufacturing cost. However, the grating lens has a characteristic in that the lens action thereof depends on the wave length of light such that the focal length thereof varies with the wave length of light. With respect to this, an ordinary semiconductor laser, which is widely used as a light source of an optical information record/read apparatus, has a characteristic in that the wave length of laser beam produced thereby varies with temperature. Accordingly, when using the grating lens as a waveguide optical system, it is necessary to perform temperature control for the ordinary semiconductor laser with high accuracy or necessary to use a semiconductor laser of a distributed feedback (DFB) type in which the shift of wave length of laser beam does not occur, resulting in an increase in the size of optical information record/read apparatus and an increase in the manufacturing cost thereof.

SUMMARY OF THE INVENTION

It is therefore an object of the present invention to provide an optical information record/read apparatus which can be easily made with low manufacturing cost and which can employ an ordinary semiconductor laser as a light source while ensuring an accurate detection of light reflected from a optical record medium without a necessity for a precise temperature control.

The object of the present invention can be achieved by an optical information record/read apparatus by which an optical information can be recorded on and-/or read out from an optical record medium, the apparatus comprising: a light source for emitting light; a converging optical system for converging the emitted light from the light source on the optical record medium so that the converged light is reflected by the optical record medium; an optical waveguide element having a waveguide layer; a light coupling system for coupling the reflected light from the optical record medium with the waveguide layer so that the light coupled with the waveguide layer is then propagated, as a guided light, within the waveguide layer, at least a part of the light coupling system being integrally formed with the optical waveguide element; a light detecting system for detecting the guided light propagated within the waveguide layer, the light detecting system being integrally formed with the optical waveguide element; and a waveguide reflection optical system for reflecting the guided light within the waveguide layer toward the light detecting system while converging the same, the waveguide reflection optical system being formed as a part of an end face of the waveguide layer.

In the above-mentioned optical information record/read apparatus, light emitted from the light source is converged on the optical record medium through the converging optical system and then reflected by the optical record medium. The reflected light is coupled with the waveguide layer of the optical waveguide element through the light coupling system and then propagated through the waveguide layer as a guided light toward the waveguide reflection optical system. The guided light is reflected by the waveguide reflection optical system and converged thereby on the light detecting system.

Namely, the guided light is not refracted but reflected by the waveguide reflection optical system. Accordingly, no change in the function of the waveguide reflection optical system occurs even when changes in the wave length of light occur. This means that the focal length of the waveguide reflection optical system is not changed even when changes in the wave length of light occurs. Therefore, it is possible to perform the accurate detection of the reflected light from the optical record medium without the necessity of precise temperature control for a light source, even when an ordinary semiconductor laser is used as the light source. This makes it possible to realize a small-sized and simplified optical information record/read apparatus.

Further, since the waveguide reflection optical system is formed as the end face of the waveguide layer, it is easy to accurately fabricate the waveguide reflection optical system by an ordinary method such as lithography. Accordingly, the optical waveguide element can be easily put into mass production, resulting in a decrease in manufacturing cost.

Further objects and advantages of the present invention will become apparent from the following description of the preferred embodiment of the invention as illustrated in the accompanying drawings.

DESCRIPTION OF THE PREFERRED EMBODIMENTS

Preferred embodiments of the present invention will now be described in detail with reference to the accompanying drawings. It is to be noted that the same or similar constituent elements are designated by the same or similar reference numerals, respectively, throughout the accompanying drawings for clarity.

Figure 1:
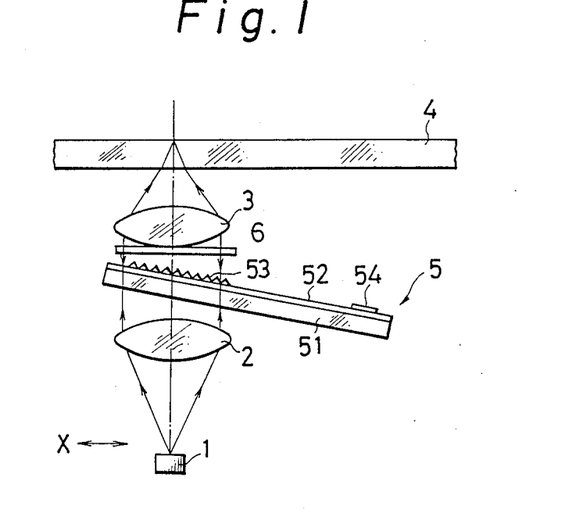
FIG. 1 is a schematic cross-sectional side view illustrating an optical information record/read apparatus according to a preferred embodiment of the present invention.
Figure 2:
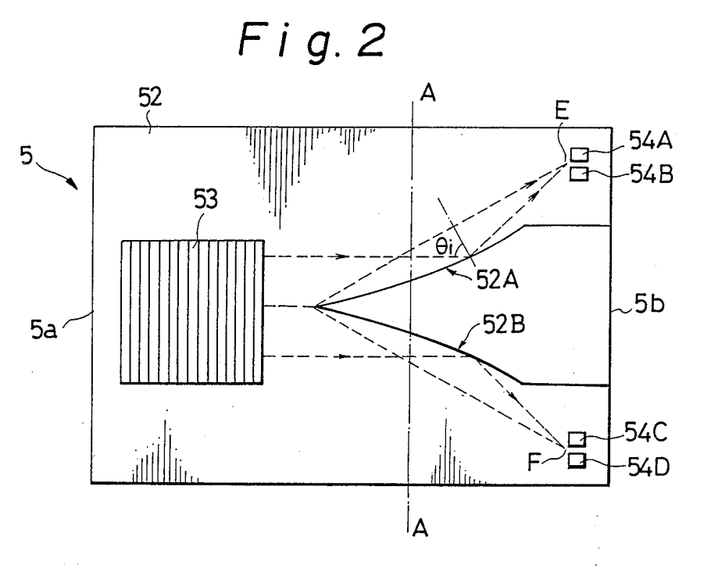
FIG. 2 is an enlarged plan view of an optical waveguide element of the optical information record/read apparatus shown in FIG. 1.
Figure 3:
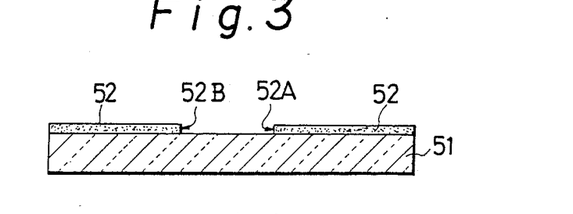
FIG. 3 is a cross-sectional end view of the optical waveguide element taken along the line A—A in FIG. 2.

FIGS. 1 to 3 illustrate an optical information record/read apparatus according to a first preferred embodiment of the present invention. Referring first to FIG. 1, reference numeral 1 designates a semiconductor laser as a light source, 2 designates a collimating lens, and 3 designates a objective lens. Further, in FIG. 1, reference numeral 4 designates an optical disk as an optical record medium, 5 designates an optical waveguide element, and 6 designates a quarter-wave plate.

The optical waveguide element 5 comprises a rectangular transparent substrate 51 which is made of, for example, a glass, quartz or the like. Formed on the surface of the substrate 51 is a waveguide layer 52 which is made of a material having a refractive index which is greater than that of the transparent substrate 51. For example, ZnS, ZnO, $CeO_2$, SiN, SiON, or Corning #7095 glass or the like can be used as the material of the waveguide layer 52. Various film forming techniques such as vacuum evaporation, spattering, or chemical vapor deposition (CVD) can be used for the formation of the waveguide layer 52 on the transparent substrate 51.

A grating coupler 53 consisting of a linear grating is formed on the surface of the waveguide layer 52 in the vicinity of a first side 5a of the optical waveguide element 5. In this embodiment, the grating coupler 53 as well as the quarter-wave plate 6 constitutes a part of a light coupling means for coupling the reflected laser beam from the optical disk 4 with the waveguide layer 52, as described later. A light detecting system 54 is secured to the waveguide layer 52 in the vicinity of a second side 5b of the optical waveguide element 5 opposite to the first side 5a.

A laser beam emitted from the semiconductor laser 1 is converted to a collimated beam by the collimating lens 2 and then passes through the optical waveguide element 5 and the quarter-wave plate 6 into the objective lens 3. By the converging or focusing action of the objective lens 3, the collimated laser beam is converted to a convergent beam which is converged or focused on the recording track of the optical disk 4. Namely, in this embodiment, a converging optical system is comprised of the collimating lens 2 and the objective lens 3.

The laser beam is reflected by the recording track of the optical disk 4 and then passes through the objective lens 3 and the quarter-wave plate 6 into the grating coupler 53. With the grating 53, the laser beam is diffracted and thus coupled with the waveguide layer 52 as a guided light. The guided light is propagated within the waveguide layer 52 toward the second side 5b of the optical waveguide element 5 and then directed to the light detecting system 54 by means of a waveguide reflection optical system, as described later in detail.

FIG. 2 shows a plan view of the optical waveguide element 5, and FIG. 3 shows a cross section of the waveguide element 5 taken along the line A—A in FIG. 2. As shown in FIG. 2, the light detecting system 54 is comprised of a first pair of photodiodes 54A and 54B and a second pair of photodiodes 54C and 54D. Each of the photodiodes is made of, for example, an amorphous Si. The first pair of photodiodes 54A and 54B as well as the second pair of photodiodes 54C and 54D are closely adjacent to each other. In FIG. 2, reference character E designates a midpoint between the two photodiodes 54A and 54B, while reference character F designates a midpoint between the two photodiodes 54C and 54D.

As shown in FIGS. 2 and 3, the waveguide layer 52 is partially removed, at a region shown to the right of the grating coupler 53, from the surface of the transparent substrate 51 in the form of a wedge shape so as to form a wedge-shaped end face of the waveguide layer 52. The wedge-shaped end face has a pair of symmetrical end face portions 52A and 52B as the above-mentioned waveguide reflection optical system.

More specifically, in this embodiment, each of the end face portions 52A and 52B of the waveguide layer 52 is shaped in the form of a parabolic curve when viewed in a direction perpendicular to the surface of the waveguide layer 52. The parabolic end face portion 52A is formed so as to have a focal point at the point E, while the parabolic end face portion 52B is formed so as to have a focal point at the point F.

In this embodiment, as shown in FIG. 3, each of the end face portions 52A and 52B of the waveguide layer 52 extends in perpendicular to the surface of the transparent substrate 51 and to the surface of the waveguide layer 52. These end face portions can be easily made by applying a dry-etching process, such as ion-beam etching or reactive ion-beam etching, to the waveguide layer 52 formed on the surface of the transparent substrate 51.

In the above-mentioned construction of the first embodiment, the laser beam coupled with the waveguide layer 52 is propagated, as the guided light, within the waveguide layer 52 toward the end face portions 52A and 52B where the guided light is divided into two and reflected.

When the laser beam from the semiconductor laser 1 has been accurately in focus on the optical disk 4, the guided light is propagated within the waveguide layer 52 toward the end face portions 52A and 52B in the form of plane wave, as shown by broken lines in FIG. 2. Accordingly, the total reflection of the guided light is performed by each of the parabolic end face portions 52A and 52B. The reflected light from the parabolic end face portions 52A and 52B are propagated, each in the form of a convergent light, toward the first pair of photodiodes 54A and 54B and the second pair of photodiodes 52C and 52D, respectively.

In this case, when the focusing operation of the converging optical system is performed accurately, two convergent lights from the end face portions 52A and 52B are focused on the points E and F, respectively, without aberration The photodiodes 52A, 52B, 52C, and 52D can output light-detecting signals Sa, Sb, Sc, and Sd, respectively. Although the output level of each of the light-detecting signals 52A, 52B, 52C, and 52D varies with the light-receiving amount of the corresponding photodiode, it is decided that the output characteristics of the photodiodes 52A, 52B, 52C, and 52D satisfy the following equation when the optical system is in focus.

$$(Sa+Sd)-(Sb+Sc)=0$$

A focusing error signal obtained as $\{(Sa+Sd)-(Sb+Sc)\}$ can be used for a focusing control based on a known Foucault method in which the objective lens 3 is servo-controlled in accordance with the focusing error signal. On the other hand, a tracking error signal obtained as $\{(Sa+Sb)-(Sc+Sd)\}$ can be used for a tracking control based on a known push-pull method. Further, a RF signal is obtained as $(Sa+Sb+Sc+Sd)$. As mentioned above, the total reflection of the guided light is performed by each of the end face portions 52A and 52B. For this purpose, the shape of each of the end face portions is determined so that when the effective index of the waveguide layer with respect to the guided light is taken as $N_1$, and the refractive index of air is 1, an incident angle $\theta_i$ of the guided light with respect to each of the end face portions 52A and 52B of the waveguide layer 52 satisfies, at any position, the following conditions:

$$\theta_i \geq \sin^{-1}(1/N_1)$$

Explanation will now be made as to the use of the quarter-wave plate 6 in the first embodiment shown in FIG. 1. The quarter-wave plate 6 in the first embodiment is used to obtain an increased efficiency in the coupling of the reflected light from the optical disk with the waveguide layer 52. Generally, as well known, a diffraction grating formed with a certain degree of fine pitch has a low diffraction efficiency for a polarized light of a parallel polarization mode (i.e., a P-polarized light) and a high diffraction efficiency for a polarized light of a orthogonal polarization mode (i.e., a S-polarized light).

Accordingly, in this embodiment, the arrangement of the semiconductor laser 1 is determined so that the plane of polarization of the emitted light from the semiconductor laser 1 is formed in a X-direction (see FIG. 1). In this case, when the emitted light is received into the grating coupler 53 through the collimating lens 2, almost all the emitted light is allowed to pass through the grating coupler 53 due to the low diffraction efficiency in the grating coupler 53. On the other hand, before the reflected light from the optical disk 4 is received into the grating coupler 53, the light passes through the quarter-wave plate 6 twice in forward and backward directions. This causes the light to be converted to a S— polarized light with respect to the grating coupler 53. Accordingly, the reflected light from the optical disk 4 is diffracted by the grating coupler 53 with a high diffraction efficiency and, accordingly, coupled with the waveguide layer 52 with a high efficiency.

Namely, in the first embodiment shown in FIG. 1, the quarter-wave plate 6 and the grating coupler 53 together constitutes a light coupling means for coupling the reflected light form the optical disk 4 with the waveguide layer 52. However, since the quarter-wave plate 6 merely serves to increase the coupling efficiency of the reflected light from the optical disk 4 with the waveguide layer 52 through the grating coupler 53, it should be understood that the quarter-wave plate 6 is not an essential constituent element of the light coupling means and thus may be omitted from the arrangement shown in FIG. 1. In other words, the light coupling means may be made of only the grating coupler 53.

Although, in the first embodiment shown in FIG. 1, each of the end face portions 52A and 52B of the waveguide layer 52 is so formed as to extend in perpendicular to the surface of the transparent substrate 51 and to the surface of the waveguide layer 52, as shown in FIG. 3, the present invention is not limited thereto. Namely, each of the end face portions of the waveguide layer 52 may be slanted with respect to the surface of the transparent substrate 51 and to the surface of the waveguide layer 52, as shown in FIG. 4.

Figure 4:
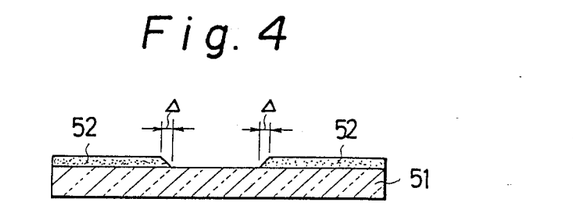
FIGS. 4 and 5 are views similar to FIG. 3, for explaining modified forms of the optical waveguide element, respectively.

In the case of an arrangement shown in FIG. 4, it is desirable that the width of slant Δ of each of the end face portions of the waveguide layer 52 is not less than the wave length of the guided light propagated within the waveguide layer 52. Wet etching or dry etching, in which an ion beam is obliquely irradiated with respect to the surface of the waveguide layer 52, may be used as a method for forming these slanted end face portions of the waveguide layer 52. Further, it is possible to form these slanted end face portions of the waveguide layer 52 during a film formation process for the waveguide layer by using a mask having an aperture in the state that the mask and the transparent substrate 51 define a slight gap therebetween.

In the case that the slanted end face portions of the waveguide layer 52 are used as the waveguide reflection optical system, it is possible to utilize the total reflection of the guided light. For this purpose, the shape of each of the end face portions is determined so that when the effective index of the transparent substrate 51 with respect to the guided light is taken as $N_2$, an incident angle $\theta_i$ of the guided light with respect to each of the end face portions of the waveguide layer 52 satisfies, at any position, the following conditions:

$$\theta_i \geq \sin^{-1}(N_2/N_1)$$

Figure 5:
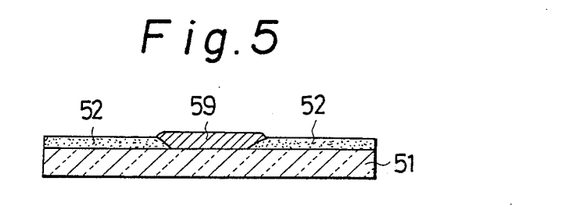

Further, as shown in FIG. 5, a low refractive index layer 59 having a refractive index which is lower than that of the waveguide layer 52 may be loaded on a region where the waveguide layer 52 has been removed from the surface of the transparent substrate 51. Various materials, for example, SiO, resin or the like, may be used for the low refractive index layer 59. The low refractive index layer 59 further serves to protect the waveguide reflection optical system. In the arrangement shown in FIG. 5, it is possible to realize the total reflection of the guided light. For this purpose, the shape of each of the end face portions is determined so that when the effective index $N_3$ of the low refractive index layer 59 with respect to the guided light is taken as $N_2 \geq N_3$, an incident angle $\theta_i$ of the guided light with respect to each of the end face portions of the waveguide layer 52 satisfies, at any position, the following conditions:

$$\theta_i \geq \sin^{-1}(N_3/N_1)$$

and so that when $N_2 \geq N_3$, an incident angle $\theta_i$ of the guided light with respect to each of the end face portions of the waveguide layer 52 satisfies, at any position, the following conditions:

$$\theta_i \geq \sin^{-1}(N_2/N_1)$$

Of course, the loading of low refractive index layer can be also applied to the precipitate end face portions as shown in FIG. 3. In this case, the conditions for the total reflection of the guided light is as follows:

$$\theta_i \geq \sin^{-1}(N_3/N_1)$$

On the other hand, when the condition of incident of the guided light with respect to each of the end face portions does not satisfy the above-mentioned condition for the total reflection, a part of the guided light is immersed in the low refractive index layer 59. In this case, however, it should be understood that the waveguide reflection optical system in the present invention is consist of the end face of the waveguide layer 52. If the low refractive index layer 59 is also considered as a waveguide layer, the end face of the waveguide layer 52 as the waveguide reflection optical system in the present invention should be also called a discontinuous surface.

Figure 6:
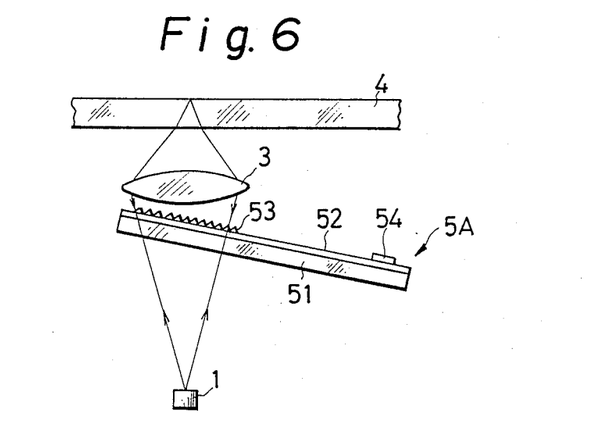
FIG. 6 is a schematic cross-sectional side view illustrating an optical information record/read apparatus according to another preferred embodiment of the present invention.
Figure 7:
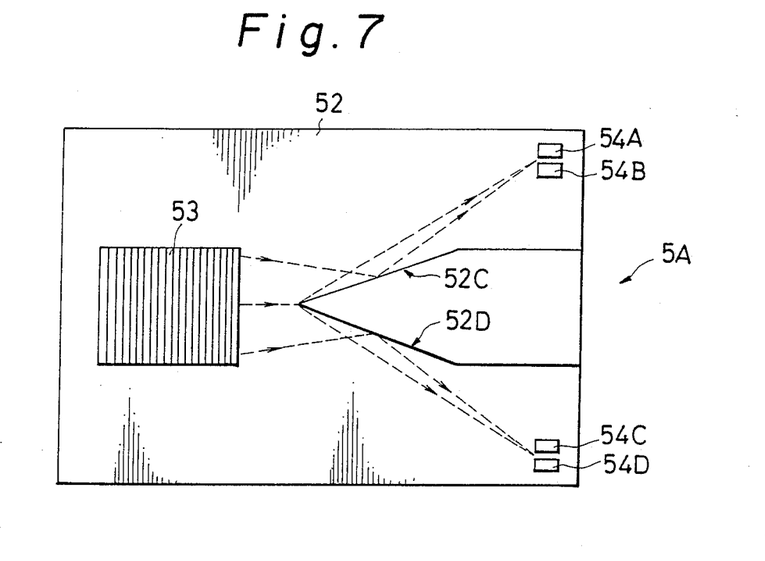
FIG. 7 is an enlarged plan view of an optical waveguide element of the optical information record/read apparatus shown in FIG. 6.

FIGS. 6 and 7 illustrate a second embodiment of the present invention, in which an optical waveguide element is designated by 5A. In the embodiment shown in FIGS. 6 and 7, light emitted from a semiconductor laser 1 passes through the optical waveguide element 5A while diverging, and converged on the memory surface of an optical disk 4 through an objective lens 3 as a converging optical system. Light reflected from the optical disk 4 is converted to a convergent light by the objective lens 3 and then received into a grating coupler 53 where the received light is diffracted thereby and then coupled with a waveguide layer 52 of the optical waveguide element 5A. The coupled light is propagated, as a convergent guided light, within the waveguide layer 52, as shown by broken lines in FIG. 7.

In the second embodiment shown in FIGS. 6 and 7, the waveguide layer 52 is formed with a pair of linear end face portions 52C and 52D which constitute a waveguide reflection optical system. The end face portions 52C and 52D are formed by removing a part of the waveguide layer 52 in the form of a wedge shape from the surface of the transparent substrate 51. Each of the end face portions 52C and 52D can be made in the form of a precipitate face similar to that shown in FIG. 3, or in the form of a slanted face similar to that shown in FIG. 4, with respect to the surface of the transparent substrate 51. Whether each of the end face portions 52C and 52D has a slant or not, a low refractive index layer can be provided on the optical waveguide element 5A in the same manner as that shown in FIG. 5.

In the second embodiment shown in FIGS. 6 and 7, since the convergent light is coupled with the waveguide layer 52 and then propagated within the waveguide layer before it arrives at the end face portions 52C and 52D, the end face portions 52C and 52D are merely required to deflect the guided light toward the light detecting system. Namely, the convergence of the guided light on the light detecting system can be attained with the linear end face portions 52C and 52D. However, end face portions can be made in the form of a curved face similar to that shown in FIG. 2, in order to change a degree of convergence of the light directed to the light detecting system. For example, increasing the degree of convergence of the light directed to the light detecting system makes it possible to reduce the distance between the waveguide reflection optical system and the light detecting system, resulting in a decrease in the size of the optical waveguide element 5A and of the optical information record/read apparatus.

Figure 8:
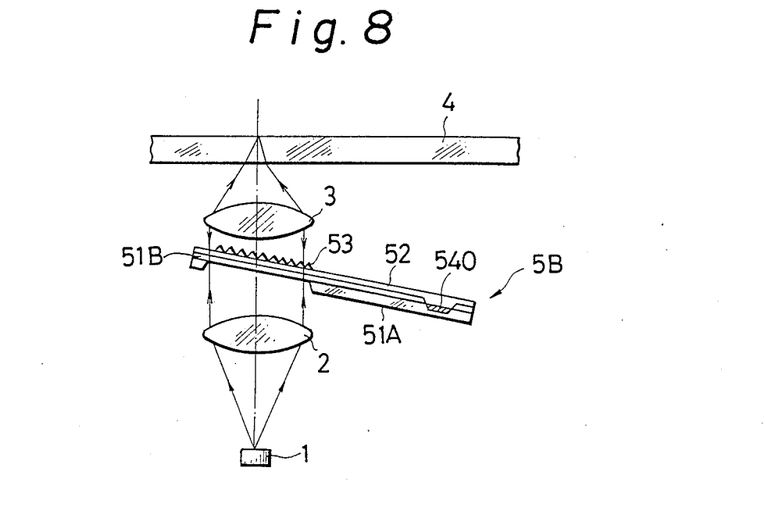
FIGS. 8 to 10 are schematic cross-sectional side views for explaining further embodiments of the present invention, respectively.

FIG. 8 shows a third embodiment of the present invention, which is similar to the first embodiment shown in FIGS. 1 to 3, except that a modification is applied to an optical waveguide element 5B. Namely, the optical waveguide element 5B comprises a substrate 51A which is made of semiconductor such as Si. Provided on the surface of the semiconductor substrate 51A is a transparent buffer layer 51B made of $SiO_2$ or the like on which a waveguide layer 52 provided thereon with a grating coupler 53 is formed.

Similarly to the first and second embodiments, a light detecting system 540 in the third embodiment is comprised of four photodiodes. However, these photodiodes in the third embodiment are made in a manner that first, the buffer layer 51B is partially removed from the surface of the semiconductor substrate 51A so as to expose a part of the surface of the semiconductor substrate, and then impurities are diffused or implanted into the exposed surface of the semiconductor substrate 51A. The semiconductor substrate 51A is formed with an opening for passing therethrough the emitted light from the semiconductor laser 1. The formation of the opening can be performed by removing a part of the semiconductor substrate 51A by wet etching, such as alkaline etching, or the above-described dry etching.

The parabolic shape of each of the end face portions in the first embodiment shown in FIG. 1 can be applied to the waveguide reflection optical system in the third embodiment, and any one of the arrangements of the face portions shown in FIGS. 3, 4, and 5 can be applied thereto.

Figure 9:
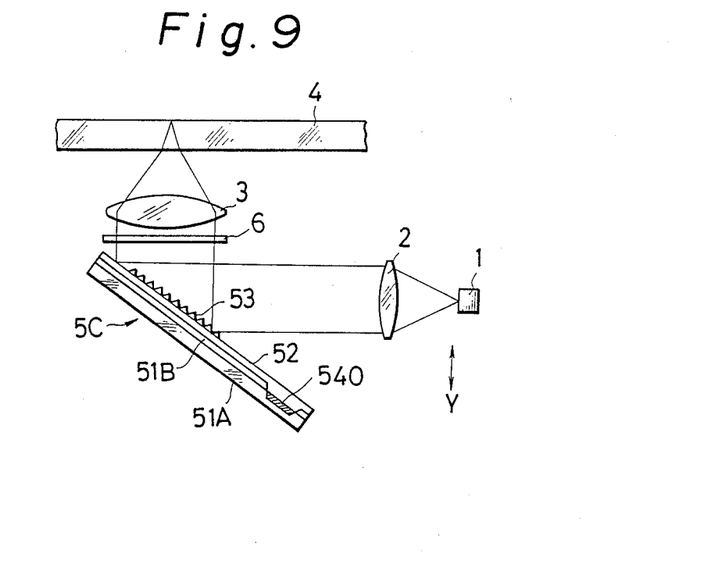

FIG. 9 shows a fourth embodiment of the present invention, in which reference numerals 1, 2, 3, and 6 designate a semiconductor laser, collimating lens, objective lens, and quarter-wave plate, respectively, as like as the first embodiment. The fourth embodiment has a characteristic in that an optical waveguide element 5C is of a reflection type. Namely, the optical waveguide element 5C has substantially the same layered structure as that in the third embodiment shown in FIG. 8, except that no portion of the semiconductor substrate 51A is removed.

In the fourth embodiment, the arrangement of the semiconductor laser 1 is determined so that the plane of polarization of light emitted therefrom is formed along a Y-direction (see FIG. 9). The emitted light from the semiconductor laser 1 is converted to a collimated light by the collimating lens 2 and passes through a grating coupler 53 substantially completely. The collimated light further passes through a waveguide layer 52 and a buffer layer 51B, and reflected by a semiconductor substrate 51A. Then, the reflected light from the semiconductor substrate 51A passes through the quarter-wave plate 6 and converged by the objective lens 3 toward the optical disk 4. Light reflected from the optical disk 4 is converted by the quarter-wave plate 6 to a state in that the plane of polarization is turned 90 degrees and thus is formed along a direction perpendicular to the Figure. Accordingly, thereafter, the reflected light from the optical disk 4 is coupled with the waveguide layer 52 of the optical waveguide element 5C by the grating coupler 53, and propagated, as a guided light, within the waveguide layer 52. The guided light is reflected by a waveguide reflection optical system and then detected by a light detecting system 540. The parabolic shape of each of the end face portions in the first embodiment shown in FIG. 1 can be applied to the waveguide reflection optical system in the fourth embodiment, and any one of the arrangements of the face portions shown in FIGS. 3, 4, and 5 can be applied thereto.

Figure 10:
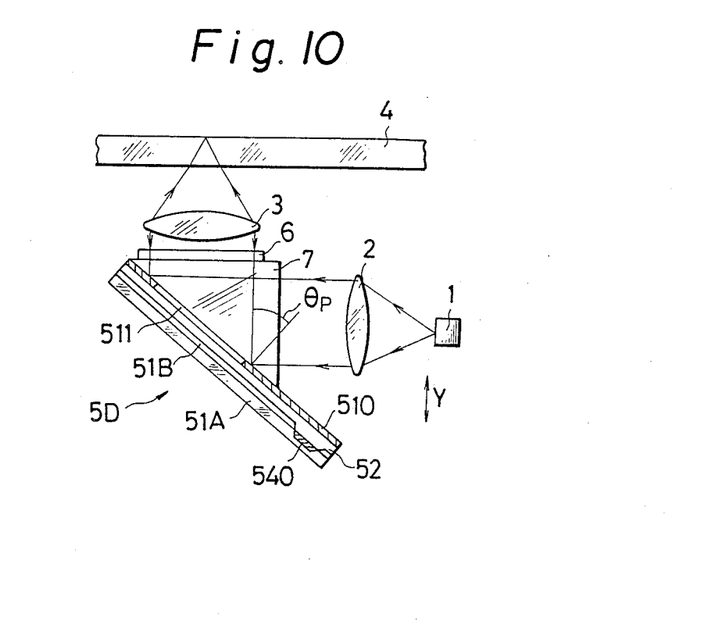

FIG. 10 shows a fifth embodiment of the present invention, in which a optical waveguide element 5D is comprised of a semiconductor substrate 51A, a buffer layer 51B, a waveguide layer 52, a light detecting system 540, a metal cladding layer 510, and a prism 7. At a region between the prism 7 and the waveguide layer 52, the metal cladding layer 510 is partially removed so as to form a gap layer 511 which is filled with air or an adhesive material or the like.

In the fifth embodiment, the arrangement of the semiconductor laser 1 is determined so that the plane of polarization of light emitted therefrom is formed along a Y-direction (see FIG. 10). The emitted light from the semiconductor laser 1 is converted to a collimated light by the collimating lens 2 and received into the prism 7. The the collimated light is then reflected in the state of a total reflection at a boundary between the prism 7 and the gap layer 511, in order to prevent the coupling of an evanescent wave from the prism 7 into the waveguide layer 52 and thereby to prevent the excitation of any guided light in the waveguide layer 52. Namely, the collimated light having the plane of polarization formed along the Y-direction is not coupled with the waveguide layer 52.

Thereafter, the reflected light passes through the quarter-wave plate 6 and then converged on the optical disk 4 by the objective lens 3. Light reflected from the optical disk 4 is converted by the quarter-wave plate 6 to a state in that the plane of polarization is turned 90 degrees. Thereafter, the reflected light is received in the prism 7 and reflected by the boundary between the prism 7 and the gap layer 511. At this time, since the plane of polarization is turned 90 degrees, an evanescent wave is oozed from the prism 7 into the gap layer 511 and thus efficiently coupled with the waveguide layer 52 where the coupled wave is propagated as a TE mode wave.

In order to attain the above-mentioned phenomenon, the thickness of the waveguide layer 52 and the refractive index thereof are determined so as to satisfy the following conditions:

$N_{TE} \neq N_{TM}$ where $N_{TE}$ and $N_{TM}$ are the effective index of the waveguide layer 52 with respect to the TE mode wave and TM mode wave, respectively.

Further, in the optical arrangement shown in FIG. 10, it is necessary that when light incident on the boundary between the prism 7 and the gap layer 511 is the P-polarized light, it cannot be coupled with the waveguide layer 52, and that when light incident on the boundary between the prism 7 and the gap layer 511 is the S-polarized light, it is coupled with the TE mode wave in the waveguide layer 52. For this purpose, when the refractive index of the prism 7 is taken as $N_p$, and the angle of incidence of light with respect to the boundary between the prism 7 and the gap layer 511 is taken as $\theta_p$, it is required to satisfy the following conditions:

$N_p \cdot \sin\theta_p = N_{TE}$ $N_{TE} \neq N_{TM}$

In the fifth embodiment, 100 percent of light emitted from the semiconductor laser 1 is reflected by the boundary between the prism 7 and the gap layer 511, and the reflected light from the optical disk 4 is coupled with the waveguide layer 52 with a high efficiency. Accordingly, an optical information record/read apparatus which is operatable with an extremely high efficiency can be realized.

On the other hand, the metal cladding layer 510 provided between the prism 7 and the waveguide layer 52 serves to prevent decoupling phenomenon in that after the reflected light form the optical disk 4 has been converted to a guided light by the above-described coupling action of the prism 7, the guided light returns to the prism 7 through the gap layer 511.

The parabolic shape of each of the end face portions in the first embodiment shown in FIG. 1 can be applied to the waveguide reflection optical system in the fifth embodiment, and any one of the arrangements of the face portions shown in FIGS. 3, 4, and 5 can be applied thereto.

Figure 11:
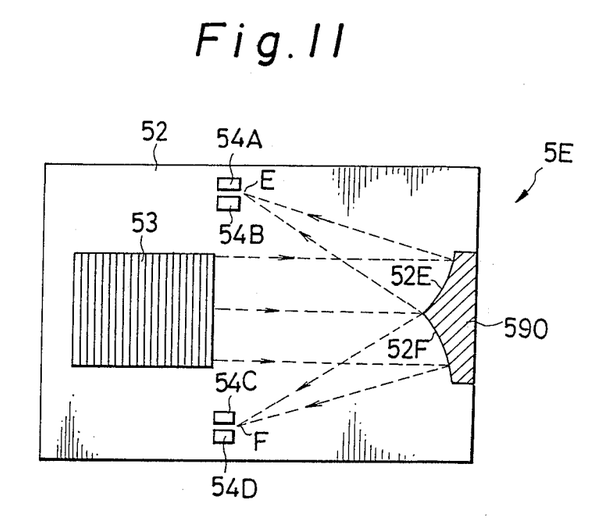
FIG. 11 is a plan view of an optical waveguide element illustrating another embodiment of the present invention.
Figure 12:
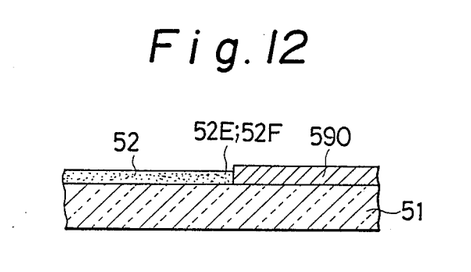
FIG. 12 is a fragmentary cross-sectional view of the optical waveguide element shown in FIG. 11.

FIGS. 11 and 12 show an essential part of a sixth embodiment of the present invention. While in the aforementioned embodiments, the waveguide reflection optical system is shaped in the form of a parabolic or linear shape so as to perform the total reflection of the guided light, an ordinary reflection is utilized in the sixth embodiment. Namely, as shown in FIG. 11, an optical waveguide element 5E in the sixth embodiment is provided with a waveguide reflection optical system which is formed as a pair of symmetrical end face portions 52E and 52F of a waveguide layer 52. The end face portions 52E and 52F for reflecting a guided light toward a light detecting system consisting of the first pair of adjacent photodiodes 54A and 54B and a second pair of adjacent photodiodes 54C and 54D are able to convert the guided light to a convergent light. The end face portion 52E has a parabolic configuration or a circular configuration approximate thereto so as to have a focal point at a midpoint E between the first pair of photodiodes 54A and 54B, while the end face portion 52F has a parabolic configuration or a circular configuration approximate thereto so as to have a focal point F between the second pair of photodiodes 54C and 54D. These end face portions 52E and 52F of the waveguide layer 52 are precipitate with respect to the surface of a transparent substrate 51, as shown in FIG. 12. These end face portions can be produced by dry etching, as mentioned above.

In the sixth embodiment, the condition of incidence of the guided light with respect to the waveguide reflection optical system does not satisfy the condition of total reflection. In order to increase the reflectance of the guided light, as shown in FIG. 12, a high reflectance layer 590 adjacent to the end face portions 52E and 52F is provided on the surface of the transparent substrate 51. The high reflectance layer 590 is made of a high reflectance metal such as Al, Ag, Au, Cu or the like. Vacuum evaporation can be used for the formation of the high reflectance metal layer 590. The high reflectance layer 590 can be made of other material such as, for example, multilayer dielectrics.

While the invention has been described in conjunction with specific embodiments thereof, it is evident that many alternatives, modifications, and variations will be apparent to those skilled in the art in light of the foregoing description. Accordingly, it is intended to include all such alternatives, modifications and variations as fall within the spirit and scope of the appended claims.

What is claimed is:

1. An optical information record/read apparatus by which an optical information can be recorded on and/or read out from an optical record medium, the apparatus comprising:
 a light source for emitting light;
 a converging optical system for converging the emitted light from the light source on the optical record medium so that the converged light is reflected by the optical record medium;
 an optical waveguide element having a waveguide layer;
 a light coupling means for coupling the reflected light from the optical record medium with the waveguide layer so that the light coupled with the waveguide layer is then propagated, as a guided light, within the waveguide layer, at least a part of the light coupling means being integrally formed with the optical waveguide element;
 a light detecting system for detecting the guided light propagated within the waveguide layer, the light detecting system being integrally formed with the optical waveguide element; and
 a waveguide reflection optical system for reflecting the guided light within the waveguide layer toward the light detecting system while converging the same, the waveguide reflection optical system being formed as a part of an end face of the waveguide layer.

2. An apparatus according to claim 1, wherein the converging optical system comprises an objective lens which is disposed in an optical path between the light source and the optical disk, the optical waveguide element being disposed between the light source and the objective lens.

3. An apparatus according to claim 2, wherein the converging optical system further comprises a collimating lens which is disposed in the optical path between the light source and the objective lens element.

4. An apparatus according to claim 2, wherein the light coupling means comprises a grating coupler formed on a plane surface of the waveguide layer.

5. An apparatus according to claim 4, wherein the light coupling means further comprises a quarter-wave plate which is disposed between the objective lens and the grating coupler.

6. An apparatus according to claim 1, wherein the light detecting system is composed of a first pair of adjacent photodiodes and a second pair of adjacent photodiodes.

7. An apparatus according to claim 6, wherein the part of the end face of the waveguide layer as the waveguide reflection optical system has a pair of symmetrical end face portions intersecting with each other at an acute angle and which are adapted to reflect the guided light propagated within the waveguide layer toward the first and second pairs of adjacent photodiodes, respectively.

8. An apparatus according to claim 7, wherein each of the end face portions is so formed as to perform total reflection of the guided light toward the corresponding adjacent photodiodes.

9. An apparatus according to claim 8, wherein each of the end face portions is formed in the form of a parabolic surface so as to have a focal point at a midpoint between the corresponding adjacent photodiodes, the guided light being propagated, as a parallel beam, toward the end face portions within the waveguide layer.

10. An apparatus according to claim 8, wherein each of the end face portions is formed in the form of a linear surface, the guided light being propagated, as a convergent beam, toward the end face portions within the waveguide layer.

11. An apparatus according to claim 7, wherein each of the end face portions extends perpendicularly to a plane surface of the waveguide layer.

12. An apparatus according to claim 7, wherein each of the end face portions is slanted with respect to a plane surface of the waveguide layer.

13. An apparatus according to claim 7, wherein the waveguide layer is provided with a low refractive index layer having a refractive index lower than that of the waveguide layer, the low refractive index layer being in close contact with the end face portions of the waveguide layer.

14. An apparatus according to claim 1, wherein the waveguide layer is provided on a substrate.

15. An apparatus according to claim 14, wherein the substrate is made of a transparent material.

16. An apparatus according to claim 14, wherein the substrate is made of a semiconductor substrate and a transparent buffer layer formed on the semiconductor substrate, the waveguide layer being formed on the transparent buffer layer.

17. An apparatus according to claim 16, wherein the substrate is formed with an opening for passing therethrough the emitted light from the light source.

18. An apparatus according to claim 16, wherein the substrate is adapted to reflect the emitted light from the light source toward the optical disk.

19. An apparatus according to claim 1, wherein the light coupling means comprises a prism provided on the waveguide layer through a gap layer.

20. An apparatus according to claim 19, wherein the gap layer is formed in a metal cladding layer which is formed between the prism and the waveguide layer.

21. An apparatus according to claim 7, wherein the waveguide layer is provided with a low refractive index layer having a refractive index lower than that of the waveguide layer, the low refractive index layer being in close contact with the end face portions of the waveguide layer.

22. An apparatus according to claim 1, wherein the light source is a semiconductor laser.

* * * * *